Patented Apr. 14, 1953

2,635,109

UNITED STATES PATENT OFFICE 2,635,109

PRODUCTION OF SILALACTONES

Leo H. Sommer, State College, Pa., assignor to Dow Corning Corporation, Midland, Mich., a corporation of Michigan No Drawing. Application October 4, 1951, Serial No. 249,795. In Great Britain June 30, 1949

3 Claims. (Cl. 260—448.2)

The present invention relates to organosilicon compounds and methods for their production.

It has been shown heretofore that the linkage of the methyl radical to silicon in silanes and in methylpolysiloxanes is quite stable to sulfuric acid. This, in fact, is one of the major advantageous properties which have resulted in the commercial importance of the methylpolysiloxanes. The present invention relates to methods of synthesis of organosilicon compounds based upon the activation of the methyl to silicon bonding of a single methyl radical whereby new types of organosilicon compounds may be produced.

In particular, the present invention involves the treatment of compounds of the general formula $(CH_3)_3Si(CH_2)_nCOOH$ with concentrated sulfuric acid, whereby compounds of the type $$HOSO_3(CH_3)_2Si(CH_2)_nCOOH \qquad (I)$$

are produced. By the addition of water to this product there are obtainable the products $$[HOOC(CH_2)_nSi(CH_3)_2]_2O \qquad (II)$$

and

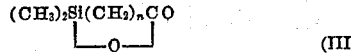
(III)

This invention further relates to the compounds so prepared in which compounds $n$ has an average value of from 2 to 5, inclusive.

The trimethylsilyl-substituted propionic to caproic acids may be prepared by the malonic ester synthesis. In this synthesis the sodium salt of diethyl malonate is reacted with a trimethylsilane in which the fourth substituent on the silicon is a halogenoalkyl from halogenomethyl to halogeno-n-butyl. The reaction thereof forms the diethyl malonate derivative of the trimethylalkylsilane. This ester, in accordance with conventional methods as employed in the malonic ester synthesis in hydrocarbon chemistry, may be saponified, hydrolyzed, and decarboxylated, whereby the chain length of the fourth alkyl radical on the silicon is increased by two carbon atoms, with the second carbon being that of a carboxyl radical.

These acids may likewise be produced by the acetoacetic ester synthesis. In this synthesis the silanes described in connection with the malonic ester synthesis are reacted with the sodium salt of ethyl acetoacetate. These acetoacetate derivatives may then be saponified, the aceto group removed and hydrolyzed, all in accordance with known methods employed in acetoacetic ester syntheses as known in hydrocarbon chemistry. By this procedure the same series of acids is produced as is produced by the malonic ester synthesis.

A third method for the production of the acids in which $n$ has a value of from 3 to 5 involves the preparation of the Grignard reagent of a trimethylsilane in which the fourth substituent is an omega-halogen-substituted n-propyl, n-butyl, or n-amyl radical. The Grignard reagent is then reacted with carbon dioxide, and the complex so formed is hydrolyzed to form the corresponding acid.

The trimethylsilyl aliphatic acids so prepared are treated with sulfuric acid of a concentration greater than 73 per cent by weight. The two reactants appear to react in equimolar proportions, though more or less of either may be present as excess and may not enter into the reaction. As the value of $n$ in the acids increases, it is desirable to use acid of concentration higher than 73 per cent sulfuric acid in order to take advantage of the greater solubilizing effect of the more highly concentrated acid.

The temperature of reaction is not critical in the cleavage of the methyl radical by sulfuric acid in accordance with the method hereof. Thus, the cleavage proceeds actively at subzero temperatures. In this cleavage only a single methyl radical is cleaved from the silicon atom. Even upon heating in the presence of a substantial excess of the concentrated sulfuric acid, cleavage of further methyl radicals is not observed. It is recognized, however, that at excessively high temperatures, such as above 250° C., cleavage of all carbon-to-silicon bonds does occur in the presence of concentrated sulfuric acid.

The acid sulfate compounds so prepared may likewise be prepared in a single step from the compositions of the general formula $$(CH_3)_3Si(CH_2)_mCH(COONa)_2$$

as are produced in the above-described malonic ester synthesis. In this general formula $m$ has a value of from 1 to 4, inclusive. When the acid sulfate derivatives hereof are produced by this procedure, the hydrolysis and decarboxylation are conducted simultaneously with the demethylation which forms the acid sulfate.

The acid sulfate of general Formula I may be hydrolyzed by the addition of water. The water added hydrolyzes an equivalent weight of the acid sulfate of general Formula I. The products obtained by such hydrolysis are the disiloxane diacid of general Formula II and the lactone of general Formula III. Immediately upon hydrolysis some of the lactone may be extracted by washing with an organic solvent which is insoluble in water. If, instead of extracting with a solvent, the hydrolyzed material is allowed to stand, the disiloxane diacid of Formula II crystallizes as a solid. The lactone may be hydrolyzed and condensed to convert it to the disiloxane diacid. Also the disiloxane diacid may be subjected to distillation whereby to obtain the lactone. In general, both the lactone and the disiloxane diacid may be obtained from all the materials of general formula I.

The disiloxane diacids hereof of general Formula II may be employed if desired as emulsifying agents for methylpolysiloxane fluids in water. For this purpose these materials may be employed in the form of the alkali metal or quaternary ammonium salts.

*Example 1*

28 grams of beta-trimethylsilylpropionic acid was added to 50 cc. of concentrated sulfuric acid of 95 per cent concentration. Frothing occurred immediately, indicating that the reaction between the two reagents was vigorous. The reaction product was constituted of a single phase. The reaction product was diluted with water to effect hydrolysis of the acid sulfate radical which had replaced one of the methyl radicals on silicon. The water was employed in amount sufficient that upon hydrolysis of the sulfate, the sulfuric acid had a concentration of less than 73 per cent, considering the amount of water present. A portion of the hydrolyzed product was allowed to stand, whereupon the following product crystallized:

$[HOOC(CH_2)_2Si(CH_3)_2]_2O$ (IV)

This compound has a melting point of 55° C.

The remaining portion of the hydrolyzed reaction product was extracted with diethyl ether. The ether extract was fractionally distilled after drying over sodium sulfate. The product obtained was as follows:

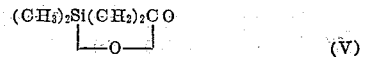

This product has a boiling point of 96° C. at 4 mm.

*Example 2*

Compound V was converted to compound IV by exposing a thin layer thereof to moist air. Compound V was likewise converted to compound IV by mixing compound V with an equal volume of concentrated hydrochloric acid. The resulting solution was evaporated to dryness. The product so obtained was compound IV. Compound V was likewise converted to compound IV by mixing 3 ml. of compound V with 3 grams of sodium hydroxide in 3 ml. of water. The resulting solution was evaporated to dryness, the residue dissolved in 5 ml. of water, and the product acidified with 5 ml. of concentrated hydrochloric acid. The solid compound IV separated from the aqueous solution.

*Example 3*

Compound IV was converted to compound V by fractionally distilling compound IV under reduced pressure. The flask was heated to 360° C. A pressure of 4 mm. was maintained. The head temperature at which the lactone product distilled was 96° C.

*Example 4*

One-half mole of the sodium salt of diethyl malonate was reacted with one-quarter mole of symmetrical bis-(chloromethyl)tetramethyldisiloxane. The mixture was reacted under reflux and resulted in the formation of a white gelatinous solid. The ethanol was strip distilled and the residue fractionally distilled. A cut was obtained which boiled at 81 to 86° C. at 1 mm. and which had a value for $n_D^{20}$ of 1.4299. 14 grams of this material was heated with 10.6 grams of potassium hydroxide and 11 ml. of water. The heating was continued for two hours at 90° C., whereupon the ethanol and water were allowed to evaporate. The residue was acidified with hydrochloric acid. Ether was added to the product, and the ether layer was separated from the aqueous layer. The ether was then evaporated. The residue from the ether layer was decarboxylated by heating at 95° C., and the product was found to be compound IV.

*Example 5*

$[HOOC(CH_2)_3Si(CH_3)_2]_2O$ (VI)

was prepared as follows:

Tetramethylsilane was chlorinated by exposing a mixture of tetramethylsilane and chlorine in liquid phase to ultraviolet light. The reaction product was fractionated, whereby chloromethyltrimethylsilane was obtained. The chloromethyltrimethylsilane, in amount of 6.8 grams, was mixed with 32.6 grams of magnesium and 25 ml. of diethyl ether. One crystal of iodine was added. When the reaction had started, there was added 184 grams of chloromethyldimethylsilane dissolved in 550 ml. of diethyl ether. The solution was stirred for two hours at 100° C. The solution was cooled to approximately −10° C., whereupon there was added 100 ml. of ethylene oxide dissolved in 125 ml. of diethyl ether. The temperature of the mixture was allowed to rise gradually. The ether was then distilled from the reaction mixture and replaced with benzene, in amount of 750 ml. The solution was poured onto one liter of cracked ice, and 250 ml. of concentrated hydrochloric acid was added. The benzene layer was fractionated, whereby gamma-trimethylsilylpropanol was obtained, which has a boiling point of 62° C. at a pressure of 6.2 mm. mercury absolute. Two moles of this product were mixed with one mole of phosphorous tribromide at 0° C. and allowed to stand for 1.5 hours. The reaction mixture was then heated to 85° C. and held at that temperature for nine hours. Excess phosphorous tribromide was decomposed with water. The residue was fractionated, whereby gamma-trimethylsilylpropyl bromide was obtained, which had a boiling point of 67.5° C. at a pressure of 21 mm. mercury. 57.5 grams of this bromide was reacted with 38 grams of magnesium in 100 ml. of diethyl ether and in the presence of one crystal of iodine. When the reaction had started, an additional 500 ml. of the ether and 235 grams of the bromide were added. The mixture was heated under reflux for fifteen hours. The product was poured onto 1500 grams of solid carbon dioxide. A solution of 140 ml. of concentrated hydrochloric acid in one liter of water was added to hydrolyze the product. The product was distilled, whereby

$(CH_3)_3Si(CH_2)_3COOH$ (VII)

was obtained, which had a boiling point of 117.8° C. at a pressure of 10 mm. mercury.

Concentrated sulfuric acid in amount of 67.5 ml. was cooled to 0° C. Compound VII was added thereto in amount of 51 grams. Gas was evolved. When the reaction had slowed down somewhat, the mixture was mildly warmed. The reaction product, which was a single phase, was poured onto cracked ice to hydrolyze the sulfate intermediate which was formed. The product from this dilution was constituted of two liquid phases. The disiloxane was obtained from the upper nonaqueous layer. The lactone was obtained from the lower sulfuric acid layer. The two layers were separated.

The nonaqueous layer was chilled to $-10°$ C., whereby a copious yield of compound VI was obtained in the form of white crystals. Subsequent crops were obtained by further chilling. This product can be recrystallized from hexane, heptane, or a mixture of acetone and water. It is soluble also in diethyl ether, acetone, ethanol, and dilute potassium hydroxide. It is insoluble in water and dilute acids. It has a melting point of 50° C.

The sulfuric acid layer was extracted with diethyl ether. The ether extract was fractionally distilled. The compound

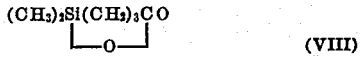
(VIII)

was obtained as a fraction boiling at 115° C. at a pressure of 14 mm. mercury. The index of refraction was $n_D^{20}$ equals 1.4560.

Example 6

A portion of compound VIII was mixed with an equal volume of 1N hydrochloric acid and the mixture was held at 0° C. for twelve hours. The solid product was filtered from the residual fluid, washed with 1N hydrochloric acid, and dried by evaporating the water at less than 50° C. The product was compound VI.

The present application is a division of my application Serial Number 155,784 filed April 13, 1950, now Patent No. 2,589,446.

That which is claimed is:

1. 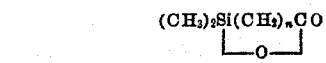

where $n$ has an average value of from 2 to 5, inclusive.

2. 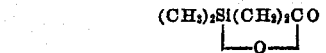

3. 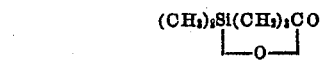

LEO H. SOMMER.

References Cited in the file of this patent

UNITED STATES PATENTS

| Number | Name | Date |
|---|---|---|
| 2,589,446 | Sommer | Mar. 18, 1952 |
| 2,589,447 | Sommer | Mar. 18, 1952 |